United States Patent
Shirai

(10) Patent No.: US 10,780,932 B2
(45) Date of Patent: Sep. 22, 2020

(54) BICYCLE TELESCOPIC APPARATUS

(71) Applicant: SHIMANO INC., Sakai (JP)

(72) Inventor: Toyoto Shirai, Sakai (JP)

(73) Assignee: SHIMANO INC., Sakai (JP)

( * ) Notice: Subject to any disclaimer, the term of this patent is extended or adjusted under 35 U.S.C. 154(b) by 356 days.

(21) Appl. No.: 15/441,317

(22) Filed: Feb. 24, 2017

(65) Prior Publication Data

US 2018/0244330 A1 Aug. 30, 2018

(51) Int. Cl.
*B62J 1/08* (2006.01)
*F16F 9/34* (2006.01)
*F16F 9/46* (2006.01)

(52) U.S. Cl.
CPC ............ *B62J 1/08* (2013.01); *B60Y 2400/405* (2013.01); *B60Y 2400/406* (2013.01); *B60Y 2400/408* (2013.01); *B60Y 2410/104* (2013.01); *B60Y 2410/105* (2013.01); *B62J 2001/085* (2013.01); *F16F 9/34* (2013.01); *F16F 9/466* (2013.01)

(58) Field of Classification Search
CPC ........... B62J 1/08; B62J 1/06; B62J 2001/085
See application file for complete search history.

(56) References Cited

U.S. PATENT DOCUMENTS

| | | | | |
|---|---|---|---|---|
| 8,550,551 | B2 * | 10/2013 | Shirai | B62J 1/00 280/221 |
| 9,126,647 | B2 * | 9/2015 | Kuo | B62J 1/08 |
| 2015/0239517 | A1 * | 8/2015 | Shirai | B62J 1/08 403/104 |

FOREIGN PATENT DOCUMENTS

DE    10 2013 008 529 B3    10/2014

* cited by examiner

*Primary Examiner* — Abiy Teka
*Assistant Examiner* — Michael Quandt
(74) *Attorney, Agent, or Firm* — Mori & Ward, LLP

(57) ABSTRACT

A bicycle telescopic apparatus includes a first tube, a second tube, an actuating member, and a hydraulic positioning structure. The first tube defines an axial direction. The second tube is telescopically received in the first tube in the axial direction. The actuating member is movable relative to the first tube in the axial direction of the first tube. The actuating member is configured to move the second tube relative to the first tube in the axial direction. The hydraulic positioning structure is configured to position the first tube and the second tube relative to each other in the axial direction.

18 Claims, 9 Drawing Sheets

BICYCLE TELESCOPIC APPARATUS

BACKGROUND OF THE INVENTION

Field of the Invention

The present invention relates to a bicycle telescopic apparatus.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One of bicycle components that have been extensively redesigned is a bicycle telescopic apparatus.

SUMMARY OF THE INVENTION

In accordance with a first aspect of the present invention, a bicycle telescopic apparatus includes a first tube, a second tube, an actuating member, and a hydraulic positioning structure. The first tube defines an axial direction. The second tube is telescopically received in the first tube in the axial direction. The actuating member is movable relative to the first tube in the axial direction of the first tube. The actuating member is configured to move the second tube relative to the first tube in the axial direction. The hydraulic positioning structure is configured to position the first tube and the second tube relative to each other in the axial direction.

With the bicycle telescopic apparatus according to the first aspect, it is possible to move the second tube using a tensile force of a cable attached to the bicycle telescopic apparatus or a drive force of a motor attached to the bicycle telescopic apparatus. Accordingly, it is possible to reduce a length of the bicycle telescopic apparatus without applying a load to the bicycle telescopic apparatus. For example, in a case where the bicycle telescopic apparatus is a seatpost, it is possible to lower a seat attached to the bicycle telescopic apparatus without sitting on the seat. Accordingly, it is possible to adjust a height of the seat in accordance with traveling condition.

In accordance with a second aspect of the present invention, the bicycle telescopic apparatus according to the first aspect is configured so that the hydraulic positioning structure is configured to position the first tube and the second tube relative to each other in a state where the actuating member is stationary relative to the first tube.

With the bicycle telescopic apparatus according to the second aspect, it is possible to securely position the second tube after the actuating member is moved.

In accordance with a third aspect of the present invention, the bicycle telescopic apparatus according to any one of the first and the second aspects is configured so that the hydraulic positioning structure includes a valve structure to open or close a fluid flow path in the bicycle telescopic apparatus.

With the bicycle telescopic apparatus according to the third aspect, it is possible to enable or disable the positional adjustment by opening or closing the fluid flow path.

In accordance with a fourth aspect of the present invention, the bicycle telescopic apparatus according to the third aspect is configured so that the actuating member is configured to be moved in a first direction along the axial direction to open the valve structure to move the second tube in the first direction.

With the bicycle telescopic apparatus according to the fourth aspect, it is possible to move the second tube only by moving the actuating member.

In accordance with a fifth aspect of the present invention, the bicycle telescopic apparatus according to any one of the third and the fourth aspects is configured so that the hydraulic positioning structure is configured to close the valve structure after the actuating member stops moving the second tube in the first direction.

With the bicycle telescopic apparatus according to the fifth aspect, it is possible to securely position the second tube after the actuating member is moved.

In accordance with a sixth aspect of the present invention, the bicycle telescopic apparatus according to any one of the fourth and the fifth aspects is configured so that the actuating member is configured to be moved in a second direction opposite to the first direction along the axial direction to open the valve structure to move the second tube in the second direction.

With the bicycle telescopic apparatus according to the sixth aspect, it is possible to both extend and shrink the bicycle telescopic apparatus by moving the actuating member. Accordingly, an air spring can be omitted in the bicycle telescopic apparatus.

In accordance with a seventh aspect of the present invention, the bicycle telescopic apparatus according to any one of the first to sixth aspects further comprises a motor to move the actuating member in the axial direction.

With the bicycle telescopic apparatus according to the seventh aspect, it facilitates the user can operate the bicycle telescopic apparatus more easily than a bicycle telescopic apparatus operated by an operation cable, because the motor electrically position the actuating member in accordance with an command inputted to a switch. In addition, it can easily control a moving amount of the actuating member corresponding to one command by setting a relationship between the command and the moving amount.

In accordance with an eighth aspect of the present invention, the bicycle telescopic apparatus according to any one of the first to seventh aspects is configured so that one of the first tube and the second tube includes an inner rod movable together with the one of the first tube and the second tube with respect to the other of the first tube and the second tube. The actuating member is configured to move the second tube via the inner rod.

With the bicycle telescopic apparatus according to the eighth aspect, it is possible to move the second tube with the inner rod coupled to the actuating member.

In accordance with a ninth aspect of the present invention, the bicycle telescopic apparatus according to the eighth aspect is configured so that the other of the first tube and the second tube includes an inner tube to accommodate the inner rod.

With the bicycle telescopic apparatus according to the ninth aspect, it is possible to provide the hydraulic positioning structure between the inner tube and the inner rod.

In accordance with a tenth aspect of the present invention, the bicycle telescopic apparatus according to the ninth aspect is configured so that the hydraulic positioning structure includes a valve structure, a piston, a first fluid chamber, and a second fluid chamber. The first fluid chamber and the second fluid chamber are provided in the inner tube. The piston is attached to the inner rod to divide a space in the inner tube into the first fluid chamber and the second fluid chamber in the axial direction.

With the bicycle telescopic apparatus according to the tenth aspect, it is possible to provide the hydraulic positioning structure between the inner tube and the inner rod.

In accordance with an eleventh aspect of the present invention, the bicycle telescopic apparatus according to the tenth aspect is configured so that the valve structure is provided between the first fluid chamber and the second fluid chamber in the axial direction.

With the bicycle telescopic apparatus according to the eleventh aspect, it is possible to enable or disable the positional adjustment by controlling the flow of the hydraulic fluid between the first fluid chamber and the second fluid chamber.

In accordance with a twelfth aspect of the present invention, the bicycle telescopic apparatus according to the eleventh aspect is configured so that the hydraulic positioning structure further includes an additional valve structure closer to the second fluid chamber than to the valve structure in the axial direction.

With the bicycle telescopic apparatus according to the twelfth aspect, it is possible to provide two valve structures, one of which is configured to be opened when the bicycle telescopic apparatus is extended, the other of which is configured to be opened when the bicycle telescopic apparatus is shrunk.

In accordance with a thirteenth aspect of the present invention, the bicycle telescopic apparatus according to any one of the fourth to the twelfth aspect further comprises an actuating member biasing member to bias the actuating member in a second direction opposite to the first direction along the axial direction.

With the bicycle telescopic apparatus according to the thirteenth aspect, it is possible to open the valve structure with a biasing force of the actuating member biasing member so that the valve structure is opened such that the hydraulic fluid flows in the second direction.

In accordance with a fourteenth aspect of the present invention, the bicycle telescopic apparatus according to any one of the tenth to the thirteenth aspect is configured so that the valve structure includes a gate, a seal, and a seal biasing member. Hydraulic fluid is to flow through the gate. The seal is to seal the gate. The seal biasing member is to bias the seal toward the gate.

With the bicycle telescopic apparatus according to the fourteenth aspect, it is possible for the seal to securely close the gate due to the biasing force of the seal biasing member.

In accordance with a fifteenth aspect of the present invention, the bicycle telescopic apparatus according to the fourteenth aspect is configured so that the seal biasing member is provided between the actuating member and the seal in the axial direction.

With the bicycle telescopic apparatus according to the fifteenth aspect, it is possible to move both the actuating member and the seal as well as to bias the seal toward the gate.

In accordance with a sixteenth aspect of the present invention, the bicycle telescopic apparatus according to any one of the first to fifteenth aspects further comprises an air chamber to bias the second tube to lengthen the second tube out of the first tube.

With the bicycle telescopic apparatus according to the sixteenth aspect, it is possible to provide a simple structure to bias the second tube toward a direction in which the second tube is to be extended. Further, it is possible to close the valve of the hydraulic positioning structure with the biasing force of the air in the air chamber to position the second tube.

In accordance with a seventeenth aspect of the present invention, the bicycle telescopic apparatus according to any one of the first to sixteenth aspects is configured so that the actuating member is connected to an operation cable to move the actuating member in a first direction along the axial direction.

With the bicycle telescopic apparatus according to the seventeenth aspect, it is possible to adjust an overall length of the bicycle telescopic apparatus in accordance with a winding amount of the operation cable.

In accordance with an eighteenth aspect of the present invention, the bicycle telescopic apparatus according to any one of the first to fourteenth aspects is configured so that the actuating member includes a seal contacting portion to contact the seal to open the valve structure when the actuating member moves in the axial direction.

With the bicycle telescopic apparatus according to the eighteenth aspect, it is possible to open the flow path of the hydraulic fluid by moving the actuating member. Further, it is possible to move the second tube in accordance with a moved position of the actuating member after the hydraulic fluid flows.

In accordance with a nineteenth aspect of the present invention, the bicycle telescopic apparatus according to any one of the first to eighteenth aspects is configured so that the actuating member includes a second tube linking portion to link with the second tube to move the second tube in the axial direction.

With the bicycle telescopic apparatus according to the nineteenth aspect, it is further possible to move the second tube using a tensile force of a cable attached to the bicycle telescopic apparatus or a drive force of a motor attached to the bicycle telescopic apparatus. Accordingly, it is further possible to reduce a length of the bicycle telescopic apparatus without applying a load to the bicycle telescopic apparatus.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
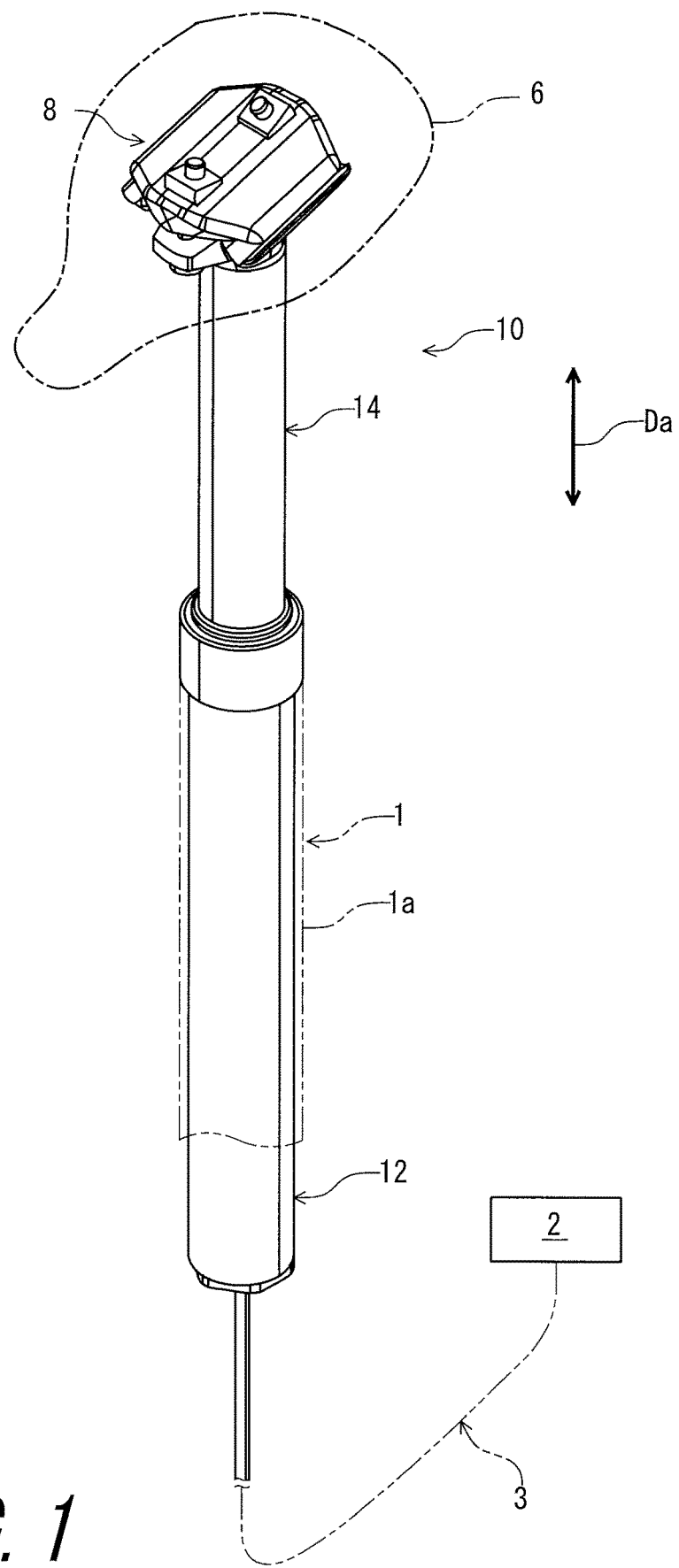
FIG. 1 is a perspective view of a bicycle telescopic apparatus in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle telescopic apparatus 10 is illustrated as a seat post. In this embodiment, the bicycle telescopic apparatus 10 is to be attached to a bicycle frame 1. The bicycle telescopic apparatus 10 comprises a first tube 12 and a second tube 14. The first tube defines an axial direction Da. The second tube 14 is telescopically received in the first tube 12 in the axial direction Da. The first tube 12 and the second tube 14 are configured to be movable relative to each other. The axial direction Da is a bilateral direction including a first direction D1 and a second direction D2. The second direction D2 is a direction in which the second tube 14 extends from the first tube 12, and the first direction D1 is a reverse direction of the second direction D2. The first tube 12 is detachably attached to a seat tube 1a of the bicycle frame 1. The bicycle telescopic apparatus 10 comprises a mounting structure 8 configured to fixedly mount a bicycle seat 6 to the second tube 14. The bicycle seat 6 is, for example, a saddle.

Figure 2:
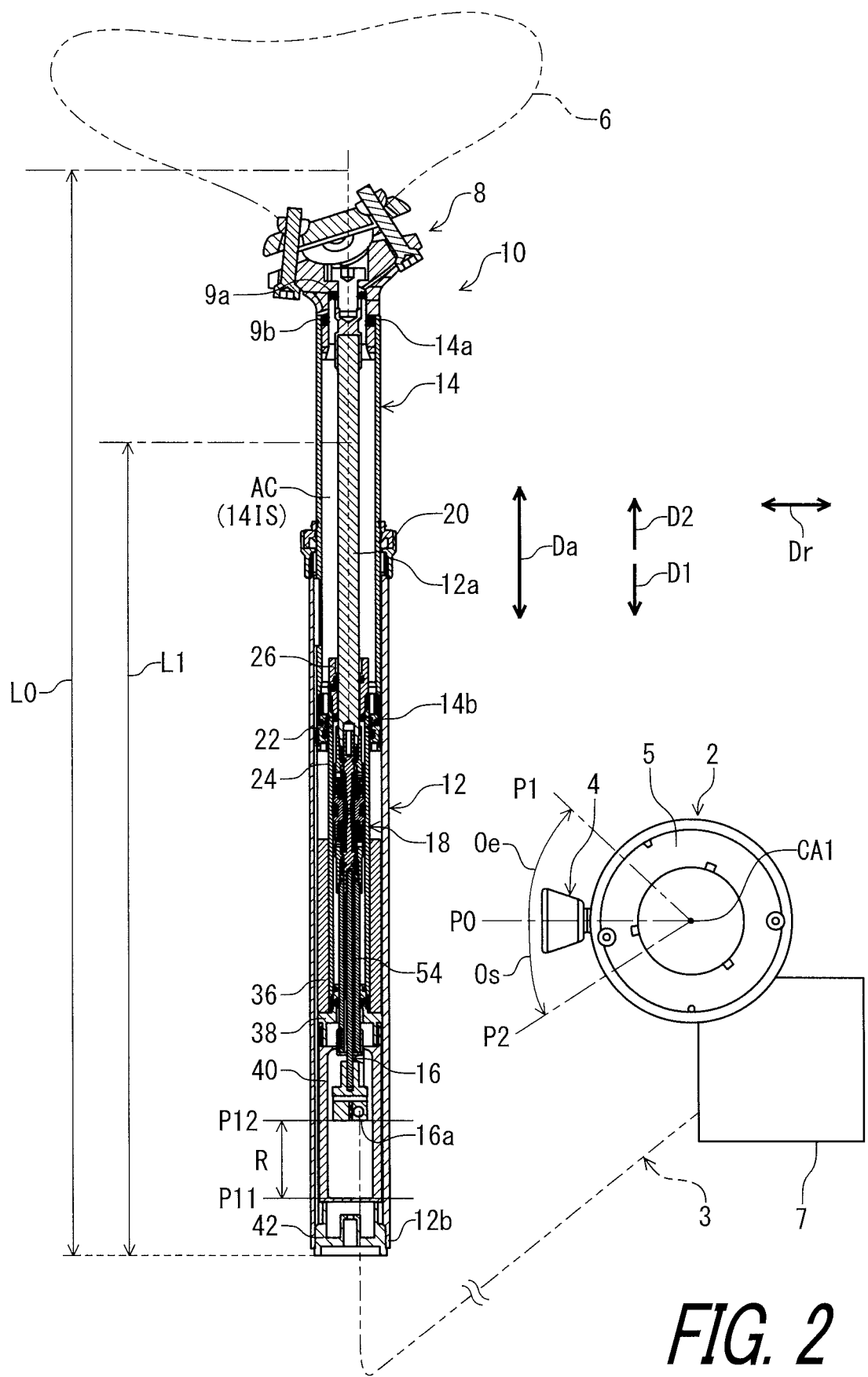
FIG. 2 is a cross-sectional view of the bicycle telescopic apparatus illustrated in FIG. 1.

As seen in FIG. 2, the first tube 12 has a distal end 12a from which the second tube 14 extends in the first direction D1 and a proximal end 12b opposite to the distal end 12a. The second tube 14 has a distal end 14a to be attached to the bicycle seat 6 and a proximal end 14b opposite to the distal end 14a. The distal end 14a is an uppermost portion of the second tube 14 in a state where the bicycle telescopic apparatus 10 is mounted to the bicycle frame 1 that is in an upright position. The proximal end 14b is a lowermost portion of the second tube 14 in a state where the bicycle telescopic apparatus 10 is mounted to the bicycle frame 1 that is in an upright position. The mounting structure 8 is attached to the distal end 14a of the second tube 14. Further, the bicycle telescopic apparatus 10 comprises an actuating member 16 and a hydraulic positioning structure 18. The actuating member 16 is movable relative to the first tube 12 in the axial direction Da of the first tube 12. The actuating member 16 is configured to move the second tube 14 relative to the first tube 12 in the axial direction Da. The hydraulic positioning structure 18 is configured to position the first tube 12 and the second tube 14 relative to each other in the axial direction Da. The actuating member 16 is configured to be operated via an operating device 2. For example, the operating device 2 is mounted on a bicycle handlebar (not shown). The actuating member 16 is operatively coupled to the operating device 2 via an operation cable 3 which is a mechanical cable such as a Bowden cable. That is, the actuating member 16 is connected to the operation cable 3 to move the actuating member 16 in the first direction D1 along the axial direction Da. In the illustrated embodiment, the actuating member 16 is directly connected to the operation cable 3, but the actuating member 16 can be indirectly connected to the operation cable 3. For example, the actuating member 16 can be connected to the operation cable 3 via an intermediate member such as a link mechanism or a rod.

In the present application, the following directional terms "front", "rear", "forward", "rearward", "left", "right", "transverse", "upward" and "downward" as well as any other similar directional terms refer to those directions which are determined on the basis of a user who sits on the bicycle seat 6 with facing a handlebar (not shown). Accordingly, these terms, as utilized to describe the bicycle telescopic apparatus 10, should be interpreted relative to a bicycle equipped with the bicycle telescopic apparatus 10 as used in an upright riding position on a horizontal surface.

As seen in FIG. 2, the operating device 2 includes an operated member 4 and a base member 5. The operated member 4 is configured to be pivotable relative to the base member 5 from a rest position P0 to an extension control position P1 about a pivot axis CA1 and from the rest position P0 to a shrinkage control position P2. After the operated member 4 is moved to the extension control position P1 or shrinkage control position P2, the operated member 4 is automatically returned to the rest position P0 due to a biasing power of a spring or an elastic member disposed in the operating device 2. In the following description, an operation of the operated member 4 from the rest position P0 to the extension control position P1 is referred to as an extension operation Oe, and an operation of the operated member 4 from the rest position P0 to the shrinkage control position P2 is referred to as a shrinkage operation Os.

The operated member 4 is connected to a cable length adjusting mechanism 7. The cable length adjusting mechanism 7 controls a length of the operation cable 3 between the cable length adjusting mechanism 7 and the actuating member 16 stepwise based on a difference between a number of the extension operations Oe and a number of the shrinkage operations Os. The cable length adjusting mechanism 7 has a substantially same architecture as an architecture that an operating unit of a bicycle for shifting operation usually includes. Accordingly, the architecture of the cable length adjusting mechanism 7 will not be described in detail here for the sake of brevity. The actuating member 16 is movable between a bottom position P11 and a top position P12 in the axial direction Da. The bottom position P11 is closer to the proximal end 12b of the first tube 12 than the top position P12. The bottom position P11 corresponds to a maximum overall length L0 (described later), and the top position P12 corresponds to a minimum overall length L1 (described later). A bottom end 16a of the actuating member 16 is pulled to the bottom position P11 via the operation cable 3 by the cable length adjusting mechanism 7 when the length of the operation cable 3 between the cable length adjusting mechanism 7 and the actuating member 16 is maximally reduced by the cable length adjusting mechanism 7.

An overall length of the bicycle telescopic apparatus 10 is adjusted roughly based on a position of the actuating member 16. The bicycle telescopic apparatus 10 has a maximum overall length L0 and a minimum overall length L1. The overall length of the bicycle telescopic apparatus 10 is adjusted to the maximum overall length L0 when the bottom end 16a of the actuating member 16 is moved to the top position P12 by adjusting the operation cable 3. The overall length of the bicycle telescopic apparatus 10 is adjusted to the minimum overall length L1 when the bottom end 16a of the actuating member 16 is pulled to the bottom position P11 by the operation cable 3. A detail mechanism to define the overall length of the bicycle telescopic apparatus 10 is described hereinafter.

Unlike the structure illustrated in FIG. 2, the operating device 2 may include two levers. One lever is for reducing the length of the operation cable 3 between the cable length adjusting mechanism 7 and the actuating member 16, and the other lever is for increasing the length of the operation cable 3 between the cable length adjusting mechanism 7 and the actuating member 16. Further, the operating device 2 may include a rotary member attached to the bicycle handlebar. In this structure, the operating device 2 may reduce the length of the operation cable 3 between the cable length adjusting mechanism 7 and the actuating member 16, when the user turns the rotary member in a first rotation direction around the bicycle handlebar. The operating device 2 may increase the length of the operation cable 3 between the cable length adjusting mechanism 7 and the actuating member 16, when the user turns the rotary member in a second rotation direction opposite to the first rotation direction.

Figure 3:
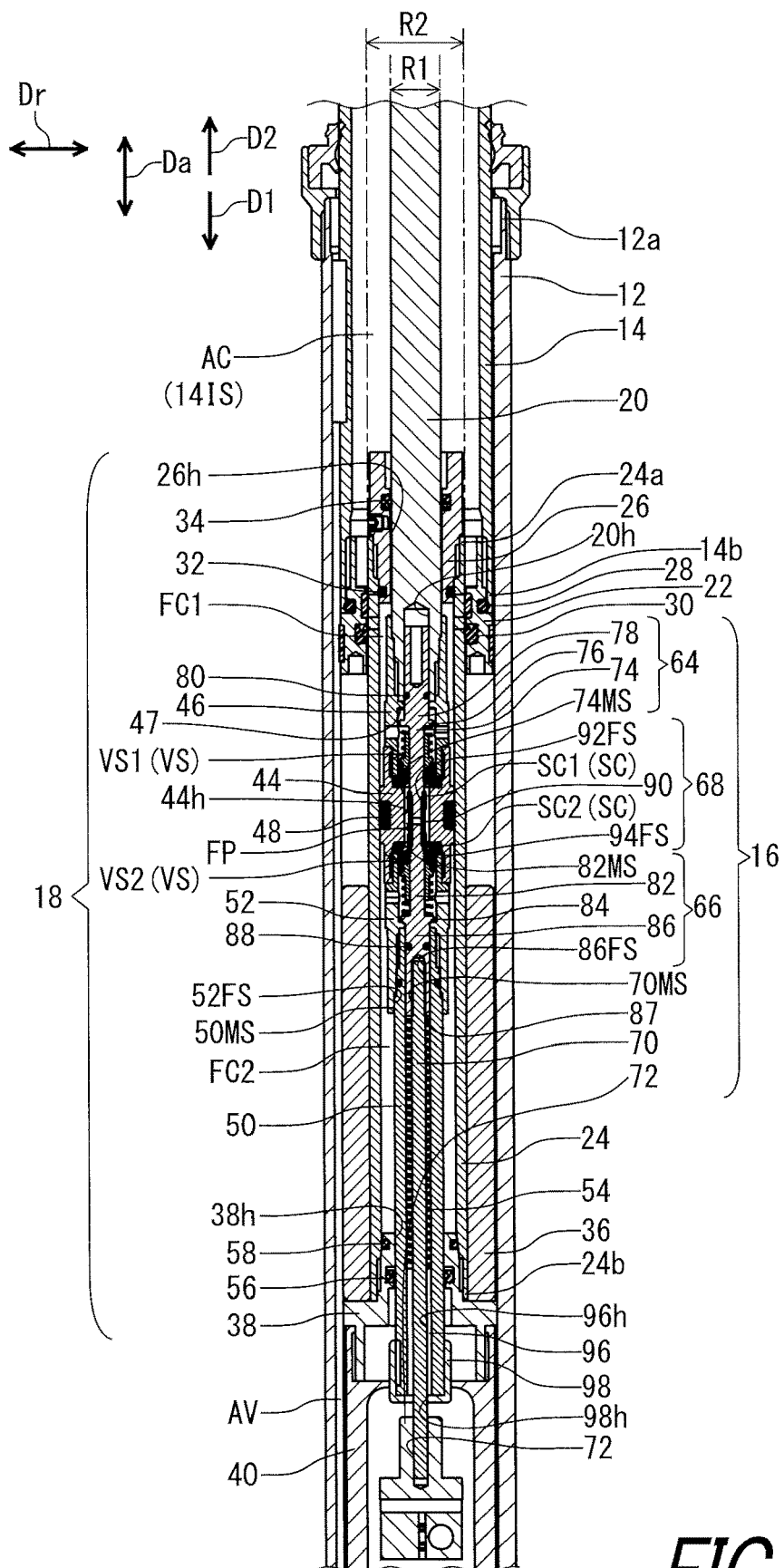
FIG. 3 is a partial cross-sectional view of the bicycle telescopic apparatus illustrated in FIG. 1 (in an initial shrinkage state, a shrinkage stop state, and an extension stop state).
Figure 4:
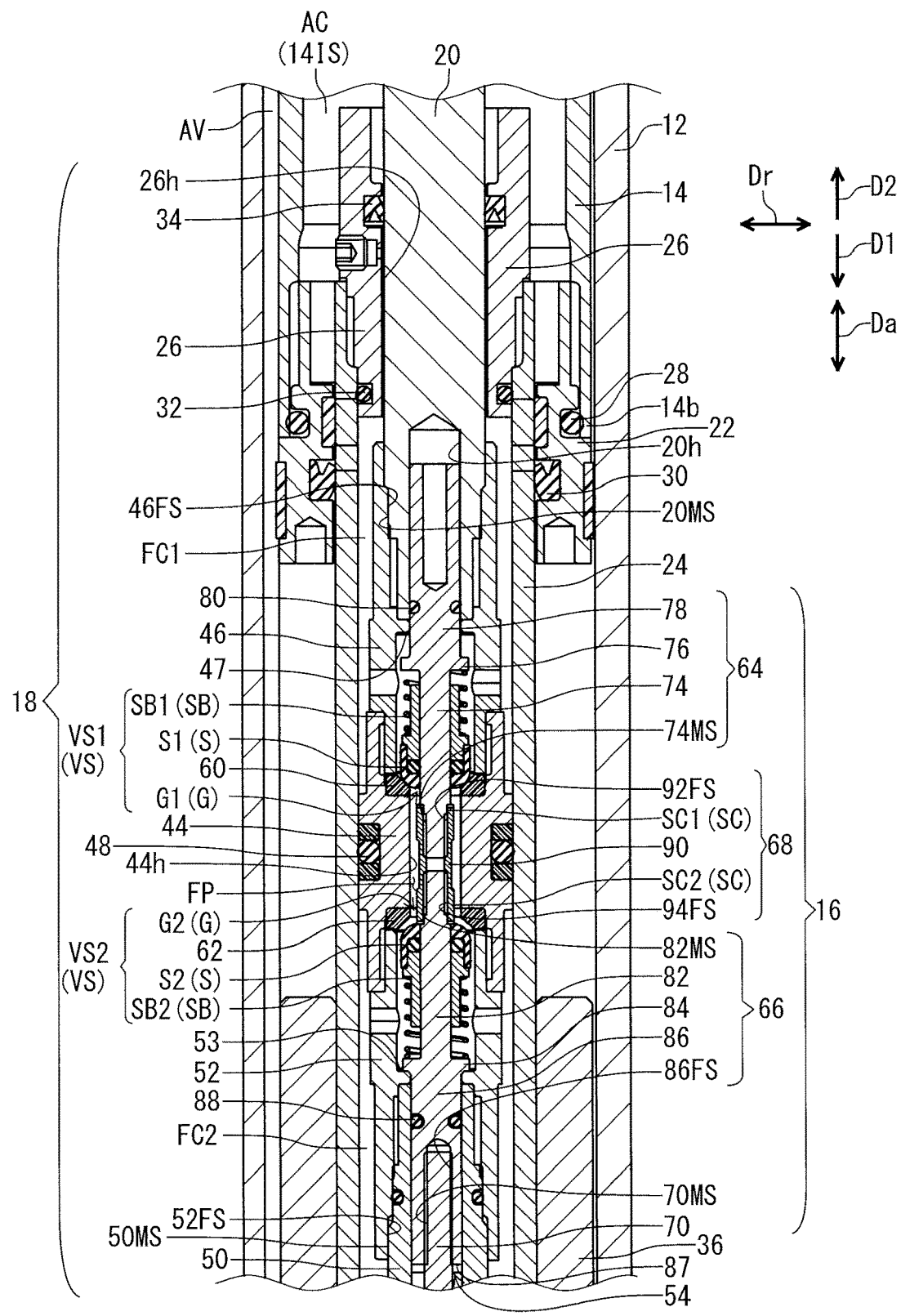
FIG. 4 is an enlarged partial cross-sectional view of the bicycle telescopic apparatus illustrated in FIG. 1 (in the initial shrinkage state, the shrinkage stop state, and the extension stop state).

As seen in FIGS. 2 to 4, the second tube 14 includes an inner rod 20 and a second tube end portion 22. The inner rod 20 is movable together with the second tube 14 with respect to the first tube 12. Specifically, the inner rod 20 is connected to the second tube 14 via the mounting structure 8. The inner rod 20 has a round columnar shape having a diameter RI. The second tube end portion 22 is provided at the proximal end 14b of the second tube 14. Further, the bicycle telescopic apparatus 10 further comprises an air chamber AC. The air chamber AC is provided in the second tube 14. Specifically, the first tube 12 includes an inner tube 24 and a first inner tube end portion 26, and the air chamber AC (an inner space 1415 of the second tube 14) is defined by the mounting structure 8, the second tube 14, the inner rod 20, the second tube end portion 22, the inner tube 24, and the first inner tube end portion 26. The inner tube 24 has a round tubular shape having an outer diameter R2. The inner tube 24 is to accommodate the inner rod 20. The first inner tube end portion 26 is provided at a first axial end 24a of the inner tube 24. The first inner tube end portion 26 has a through hole 26h through which the inner rod 20 is to be inserted. Other features of the inner tube 24 and the first inner tube end portion 26 are described in detail below. The second tube end portion 22 is provided between the second tube 14 and the inner tube 24 in a radial direction Dr perpendicular to the axial direction Da. The second tube end portion 22 comprises a piston slidably movable along an inner peripheral surface of the first tube 12 in the axial direction Da. As seen in FIG. 2, a gap between the mounting structure 8 and the inner rod 20 is sealed by a first mounting structure seal 9a. A gap between the mounting structure 8 and the second tube 14 is sealed by a second mounting structure seal 9b. As seen in FIGS. 3 and 4, a gap between the second tube 14 and the second tube end portion 22 is sealed by a first end portion seal 28. A gap between the second tube end portion 22 and the inner tube 24 is sealed by a second end portion seal 30. A gap between the inner tube 24 and the first inner tube end portion 26 is sealed by a third end portion seal 32. A gap between the first inner tube end portion 26 and the inner rod 20 is sealed by a fourth end portion seal 34. Specifically, the fourth end portion seal 34 is provided on the through hole 26h. Since the second tube 14 is provided with seals 9a, 9b, 28, 30, 32, and 34, the air chamber AC is an airtight chamber. When the second tube 14 is moved in the first direction D1, a volume of the air chamber AC is reduced due to a difference between the outer diameter R2 of the inner tube 24 and the diameter R1 of the inner rod 20 and thereby an air pressure in the air chamber AC to push the second tube 14 in the second direction D2 increases. Accordingly, the air chamber AC is to bias the second tube 14 to lengthen the second tube 14 out of the first tube 12.

As seen in FIGS. 3 and 4, the bicycle telescopic apparatus 10 includes a second inner tube sliding stopper 36 facing the second tube end portion 22 in the axial direction Da. The second inner tube sliding stopper 36 is supported by a second inner tube end portion 38 which is connected to the first tube 12 via a second inner tube end portion supporting member 40 and a first tube end portion 42 (See FIG. 2). Accordingly, the second inner tube sliding stopper 36 is stationary relative to the first tube 12. The second tube end portion 22 can contact the second inner tube sliding stopper 36 when the overall length of the bicycle telescopic apparatus 10 becomes minimum. The first tube 12 includes an air vent AV between the first tube 12 and each of the second tube 14, the second inner tube sliding stopper 36, the second inner tube end portion 38, and the second inner tube end portion supporting member 40. Air between the second inner tube sliding stopper 36 and the second tube end portion 22 can be leaked out of the distal end 12a or the proximal end 12b of the first tube 12 via the air vent AV when the second tube 14 is moved in the first direction D1.

As seen in FIGS. 3 and 4, the hydraulic positioning structure 18 includes a piston 44 attached to the inner rod 20 to divide a space in the inner tube 24 into a first fluid chamber FC1 and a second fluid chamber FC2 in the axial direction Da. Accordingly, the hydraulic positioning structure 18 includes the first fluid chamber FC1 and the second fluid chamber FC2 which are provided in the inner tube 24. Specifically, the hydraulic positioning structure 18 includes an inner rod connecting member 46 connecting the inner rod 20 and the piston 44. That is, the inner rod connecting member 46 is movable together with the inner rod 20 and the piston 44. For example, the inner rod 20 has a male screw 20MS, and the inner rod connecting member 46 has a female screw 46FS. The inner rod 20 is screwed into the inner rod connecting member 46. In addition, for example, the inner rod connecting member 46 is press fitted into the piston 44. Further, the hydraulic positioning structure 18 includes a piston seal 48 to prohibit oil from flowing between the first fluid chamber FC1 and the second fluid chamber FC2 via a gap between the piston 44 and the inner tube 24. The piston seal 48 is slidable on an inner wall of the inner tube 24. That is, the piston 44 is movable in the axial direction Da in the inner tube 24. Since the piston 44 is connected to the inner rod 20, a position of the piston 44 defines the position of the second tube 14 relative to the first tube 12. Accordingly, the hydraulic positioning structure 18 is configured to position the first tube 12 and the second tube 14 relative to each other in the axial direction Da.

As seen in FIG. 3, the hydraulic positioning structure 18 further includes a biasing member accommodating tube 50, a tube connecting member 52, and the second inner tube end portion 38. The biasing member accommodating tube 50 accommodates an actuating member biasing member 54 which is described in detail below. The tube connecting member 52 connects the piston 44 and the biasing member accommodating tube 50. That is, a biasing member accommodating tube 50 and a tube connecting member 52 are movable together with the inner rod 20 and the piston 44. For example, the tube connecting member 52 is press fitted into the piston 44. Further, for example, the biasing member accommodating tube 50 has a male screw 50MS, and the tube connecting member 52 has a female screw 52FS. The biasing member accommodating tube 50 is screwed into the tube connecting member 52. The second inner tube end portion 38 is provided at a second axial end 24b of the inner tube 24 which is opposite to the first axial end 24a in the axial direction Da. The second inner tube end portion 38 has a through hole 38h through which the biasing member accommodating tube 50 is to be inserted. As seen in FIG. 3, a gap between the inner tube 24 and the second inner tube end portion 38 is sealed by a fifth end portion seal 56. A gap between the second inner tube end portion 38 and the biasing member accommodating tube 50 is sealed by a sixth end portion seal 58.

As seen in FIGS. 3 and 4, the hydraulic positioning structure 18 includes a first valve structure VS1 and a second valve structure VS2 closer to the second fluid chamber FC2 than to the first valve structure VS1 in the axial direction Da. In the present application, each of the first valve structure VS1 and the second valve structure VS2 can be referred to as a valve structure VS. When one of the first valve structure VS1 and the second valve structure VS2 is referred to as the valve structure VS, the other of first valve structure VS1 and the second valve structure VS2 can referred to as another valve structure. Accordingly, the hydraulic positioning structure 18 includes the valve structure VS. Alternatively, the hydraulic positioning structure 18 includes the valve structure VS and another valve structure. The valve structure VS is provided between the first fluid chamber FC1 and the second fluid chamber FC2 in the axial direction Da. Specifically, both the first valve structure VS1 and the second valve structure VS2 are provided between the first fluid chamber FC1 and the second fluid chamber FC2 in the axial direction Da. Further, the piston 44 is provided between the first valve structure VS1 and the second valve structure VS2.

As seen in FIG. 4, the valve structure VS includes a gate G through which hydraulic fluid to flow, a seal S to seal the gate G, and a seal biasing member SB to bias the seal S toward the gate G. Specifically, the first valve structure VS1 includes a first gate G1, a first seal S1, and a first seal biasing member SB1. The second valve structure VS2 includes a second gate G2, a second seal S2, and a second seal biasing member SB2. The first gate G1 is defined by a first seal contact member 60. The second gate G2 is defined by a second seal contact member 62. When the first seal S1 contacts the first seal contact member 60, the first seal S1 seals the first gate G1. That is, the first gate G1 is closed. When the first seal S1 is separated from the first seal contact member 60, the first gate G1 is opened. When the second seal S2 contacts the second seal contact member 62, the second seal S2 seals the second gate G2. That is, the second gate G2 is closed. When the second seal S2 is separated from the second seal contact member 62, the second gate G2 is opened. The first seal contact member 60 and the second seal contact member 62 are attached to the piston 44. The first seal contact member 60 is sandwiched between the piston 44 and the inner rod connecting member 46 in the axial direction Da. The second seal contact member 62 is sandwiched between the piston 44 and the tube connecting member 52 in the axial direction Da. Accordingly, the first seal contact member 60 and the second seal contact member 62 are movable together with the piston 44 in the axial direction Da. Therefore, the first gate G1 and the second gate G2 are movable together with the piston 44 in the axial direction Da. The piston 44 has a piston through hole 44h between the first gate G1 and the second gate G2 to constitute a fluid passage FP through which the hydraulic fluid flows when the first gate G1 and the second gate G2 are opened. In other words, the hydraulic positioning structure 18 includes the valve structure VS to open or close a fluid flow path in the bicycle telescopic apparatus 10. The first seal S1, the second seal S2, the first seal biasing member SB1, and the second seal biasing member SB2 are attached to the actuating member 16, and they are moved by the actuating member 16.

As seen in FIG. 3, the actuating member 16 includes a first seal attachment member 64, a second seal attachment member 66, a seal contacting member 68, an operation cable connector attachment member 70, and an operation cable connector 72. The operation cable 3 is connected to the operation cable connector 72. The first seal attachment member 64, the second seal attachment member 66, the seal contacting member 68, the operation cable connector attachment member 70 are movable together with the operation cable connector 72. Accordingly, when the operation cable 3 is pulled in the first direction D1, the first seal attachment member 64, the second seal attachment member 66, the seal contacting member 68, the operation cable connector attachment member 70, and the operation cable connector 72 are moved in the first direction D1. When the operation cable 3 is released (extended) in the second direction D2, the first seal attachment member 64, the second seal attachment member 66, the seal contacting member 68, the operation cable connector attachment member 70, and the operation cable connector 72 are movable in the second direction D2.

As seen in FIG. 4, the first seal attachment member 64 includes a first seal attachment portion 74, a first seal biasing member attachment portion 76, and an inner rod attachment portion 78. The first seal S1 is slidably attached to the first seal attachment portion 74. That is, the first seal S1 is slidable along the first seal attachment portion 74. The first seal biasing member attachment portion 76 extends from the first seal attachment portion 74 in the radial direction Dr. The first seal biasing member SB1 abuts against the first seal biasing member attachment portion 76 to bias the first seal S1 toward the first gate G1. That is, the seal biasing member SB is provided between the actuating member 16 and the seal S in the axial direction Da. Accordingly, the first valve structure VS1 is a one-way valve to open the first gate G1 when the hydraulic fluid flows from the second fluid chamber FC2 to the first fluid chamber FC1 and to close the first gate G1 when the hydraulic fluid flows from the first fluid chamber FC1 to the second fluid chamber FC2. The inner rod attachment portion 78 is configured to be inserted into the insertion hole 20h of the inner rod 20. That is, the first seal attachment member 64 is slidably attached to an insertion hole 20h of the inner rod 20. The inner rod attachment portion 78 can have a smaller diameter than that of the first seal biasing member attachment portion 76 so that the first seal biasing member attachment portion 76 can contact a first actuating member receiving portion 47 of the inner rod connecting member 46 to keep the first seal S1 separated from the first gate G1 within an appropriate distance. Further, the hydraulic positioning structure 18 further includes an inner rod hole seal 80 attached to the inner rod attachment portion 78 to seal a gap between the inner rod attachment portion 78 and the inner rod 20. The seals 32, 34, 48 and 80 prevent the hydraulic fluid in the first fluid chamber FC1 from leaking out of the first fluid chamber FC1 except through the first gate G1.

As seen in FIG. 4, the second seal attachment member 66 includes a second seal attachment portion 82, a second seal biasing member attachment portion 84, and a connector attachment member attachment portion 86. The second seal S2 is slidably attached to the second seal attachment portion 82. That is, the second seal S2 is slidable along the second seal attachment portion 82. The second seal biasing member attachment portion 84 extends from the second seal attachment portion 82 in the radial direction Dr. The second seal biasing member SB2 abuts against the second seal biasing member attachment portion 84 to bias the second seal S2 toward the second gate G2. That is, the seal biasing member SB is provided between the actuating member 16 and the seal S in the axial direction Da. Accordingly, the second valve structure VS2 is a one-way valve to open the second gate G2 when the hydraulic fluid flows from the first fluid chamber FC1 to the second fluid chamber FC2 and to close the second gate G2 when the hydraulic fluid flows from the second fluid chamber FC2 to the first fluid chamber FC1. The connector attachment member attachment portion 86 is connected to the operation cable connector attachment member 70. For example, the operation cable connector attachment member 70 has a male screw 70MS, and the connector attachment member attachment portion 86 has a female screw 86FS. The operation cable connector attachment member 70 is screwed into the connector attachment member attachment portion 86. The connector attachment member attachment portion 86 has a smaller diameter than that of the second seal biasing member attachment portion 84 so that the second seal biasing member attachment portion 84 can contact a second actuating member receiving portion 53 of the tube connecting member 52 to pull the second tube 14 in the first direction D1 when the operation cable 3 is pulled in the first direction D1. That is, the actuating member 16 moves the inner rod 20 in the first direction D1. In this embodiment, the actuating member 16 is a different member from the inner rod 20, but the actuating member 16 and the inner rod 20 can be integrated into a one-piece unitary member. Accordingly, the second seal biasing member attachment portion 84 can be also referred to as a second tube linking portion 84. In other words, the actuating member 16 includes the second tube linking portion 84 to link with the second tube 14 to move the second tube 14 in the axial direction Da. However, the actuating member 16 can link with another part of the second tube 14 when the actuating member 16 moves the second tube 14 in the axial direction Da. Further, the hydraulic positioning structure 18 further includes an accommodating tube seal 88 attached to the connector attachment member attachment portion 86 to seal a gap between the connector attachment member attachment portion 86 and the biasing member accommodating tube 50. The seals 48, 56, 58, and 86 prevent the hydraulic fluid in the second fluid chamber FC2 from leaking out of the second fluid chamber FC2 except through the second gate G2.

As seen in FIG. 4, the seal contacting member 68 includes a middle portion 90, a first seal contacting portion SC1, and a second seal contacting portion SC2. The first seal contacting portion SC1 extends from the first seal attachment portion 74 in the radial direction Dr to contact the first seal S1 to open the first valve structure VS1 when the actuating member 16 moves in the second direction D2. The second seal contacting portion SC2 extends from the second seal attachment portion 82 in the radial direction Dr to contact the second seal S2 to open the second valve structure VS2 when the actuating member 16 moves in the first direction D1. In the present application, the first seal contacting portion SC1 and the second seal contacting portion SC2 can be referred to as a seal contacting portion SC. Accordingly, the actuating member 16 includes the seal contacting portion SC to contact the seal S to open the valve structure VS when the actuating member 16 moves in the axial direction Da. The middle portion 90 connects the first seal contacting portion SC1 and the second seal contacting portion SC2. The fluid passage FP is provided between the piston 44 and each of the first seal contacting portion SC1, the second seal contacting portion SC2, and the middle portion 90 in the piston through hole 44h. The seal contacting member 68 is connected to the first seal attachment member 64 and the second seal attachment member 66. For example, the seal contacting member 68 has female screws 92FS and 94FS. The first seal attachment portion 74 has a male screw 74MS corresponding to the female screw 92FS, and the first seal attachment member 64 is screwed into the seal contacting member 68. The second seal attachment portion 82 has a male screw 82MS, and the second seal attachment member 66 is screwed into seal contacting member 68.

As seen in FIGS. 3 and 4, the bicycle telescopic apparatus 10 further comprises the actuating member biasing member 54 to bias the actuating member 16 in the second direction D2 opposite to the first direction D1 along the axial direction Da. Specifically, the actuating member biasing member 54 is supported by a biasing member supporting member 96. The biasing member supporting member 96 is supported by a tube end cap 98 which is connected to the biasing member accommodating tube 50 for example with press-fitting. Accordingly, the actuating member biasing member 54 is movable together with the piston 44 and the inner rod 20. Since the connector attachment member attachment portion 86 has a larger diameter than that of the operation cable connector attachment member 70 as seen in FIGS. 3 and 4, a proximal end 87 of the connector attachment member attachment portion 86, which is opposite to the second seal biasing member attachment portion 84 in the axial direction Da, abuts the biasing member supporting member 96. Further, the operation cable connector attachment member 70 is provided through the actuating member biasing member 54, a through hole 96h of the biasing member supporting member 96, and a through hole 98h of the tube end cap 98 to be connected to the operation cable connector 72. For example, the operation cable connector attachment member 70 has a male screw 70MS, while the operation cable connector 72 has a female screw 72FS. The operation cable connector attachment member 70 is screwed into the operation cable connector 72. According to the above structure, the actuating member biasing member 54 biases the actuating member 16 in the second direction D2 with a maximum biasing power when the actuating member 16 contacts the hydraulic positioning structure 18 at the second tube linking portion 84.

The operation of the bicycle telescopic apparatus 10 will be described in detail below.

As seen in FIG. 4, when the shrinkage operation Os is inputted to the operating device 2, the operation cable 3 is pulled in the first direction D1, thereby the second tube linking portion 84 of the actuating member 16 contacts the second actuating member receiving portion 53 of the tube connecting member 52 to pull the second tube 14 in the first direction D1. Simultaneously, the second seal contacting portion SC2 of the seal contacting member 68 contacts the second seal S2 to open the second gate G2. That is, the actuating member 16 is configured to be moved in the first direction D1 along the axial direction Da to open the valve structure VS to move the second tube 14 in the first direction D1. In the present application, a state of the bicycle telescopic apparatus 10 when the shrinkage operation Os is inputted to the operating device 2 is referred to as the initial shrinkage state. After the initial shrinkage state, the fluid pressure in the second fluid chamber FC2 is increased to open the first gate G1 (See FIG. 5).

Figure 5:
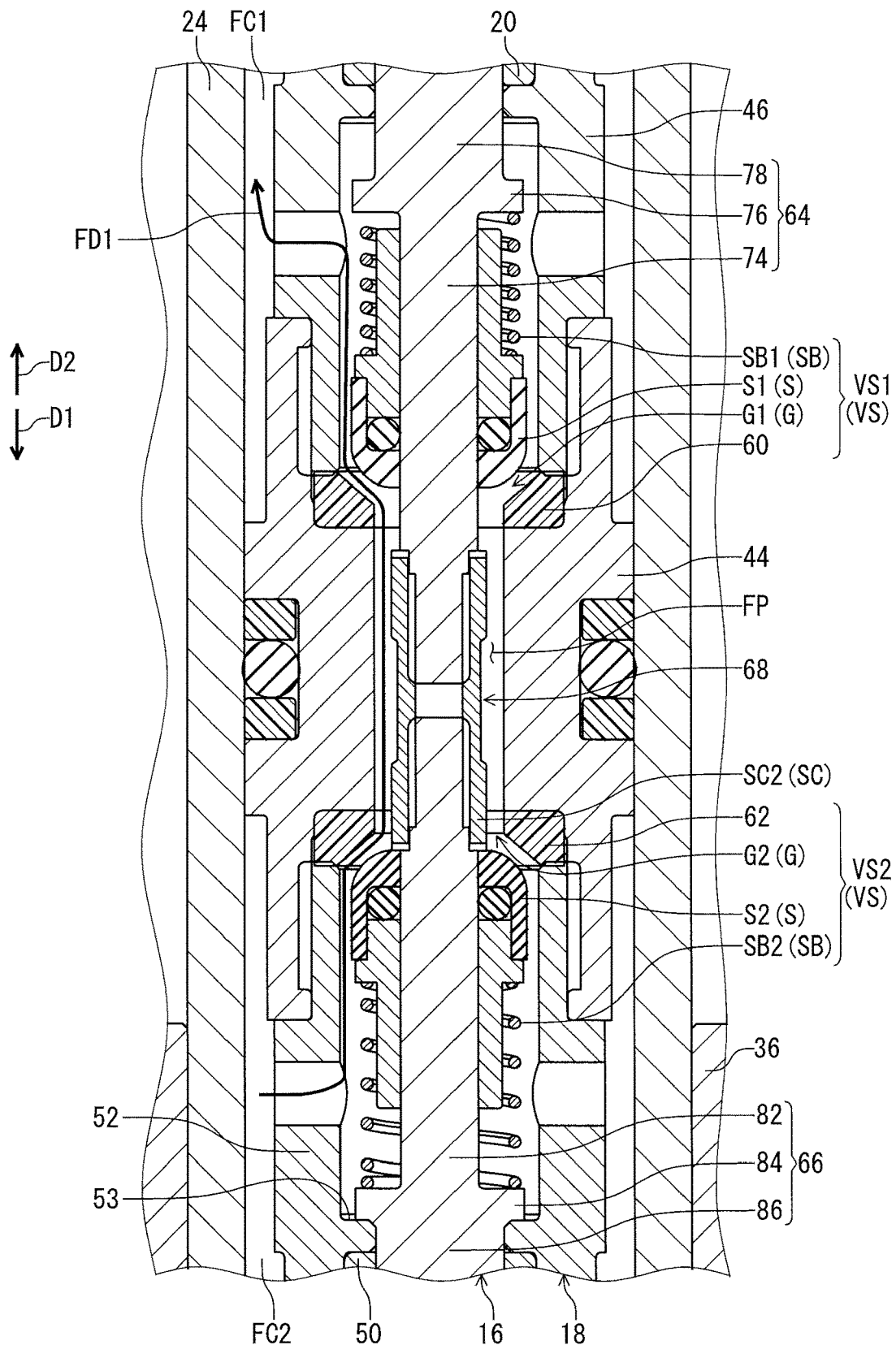
FIG. 5 is an enlarged partial cross-sectional view of the bicycle telescopic apparatus illustrated in FIG. 1 (in a shrinking state).

In the shrinking state shown in FIG. 5, while the actuating member 16 as well as the hydraulic positioning structure 18 is moved in the first direction D1 by the operation cable 3, the hydraulic fluid in the second fluid chamber FC2 flows into the first fluid chamber FC1 in a first flow direction FD1 as illustrated in FIG. 5.

Figure 6:
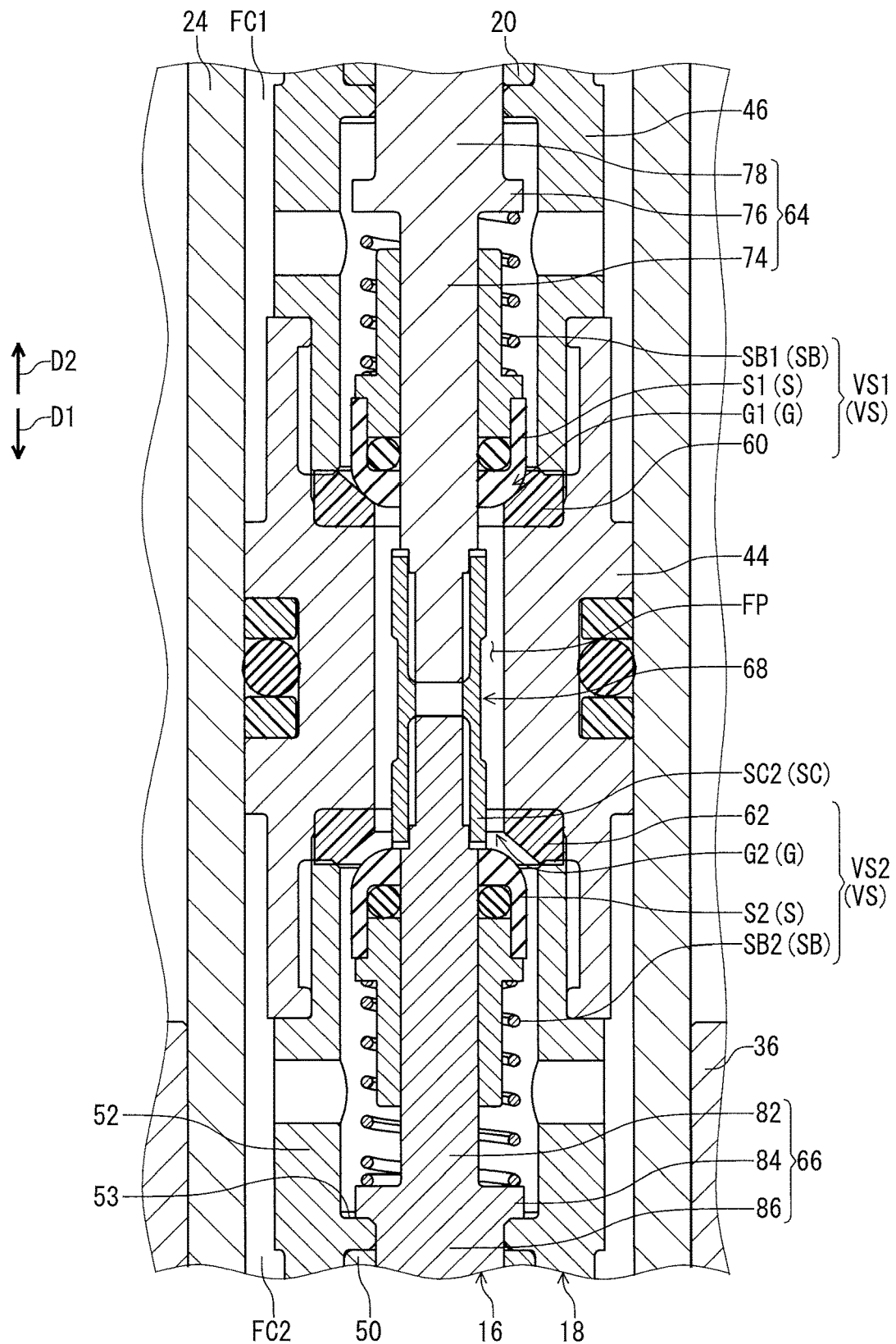
FIG. 6 is an enlarged partial cross-sectional view of the bicycle telescopic apparatus illustrated in FIG. 1 (in the shrinkage stop state, the extension stop state, and the initial shrinkage state).

When the operation cable 3 stops moving in the first direction D1, the hydraulic fluid in the second fluid chamber FC2 does not push the first seal S1. In addition, when the operation cable 3 stops moving, the expansion force of the air in the air chamber AC applies to the fluid in the first fluid chamber FC1, thereby the fluid pressure in the first fluid chamber FC1 becomes greater than that of the second fluid chamber FC2. Accordingly, as seen in FIG. 6, the hydraulic fluid in the first fluid chamber FC1 presses the first seal S1 and the first seal biasing member SB1 presses the first seal S1 against the first seal contact member 60 to close the first gate G1. In the present application, a state of the bicycle telescopic apparatus 10 when the operation cable 3 stops moving in the first direction D1 is referred to as the shrinkage stop state.

Figure 7:
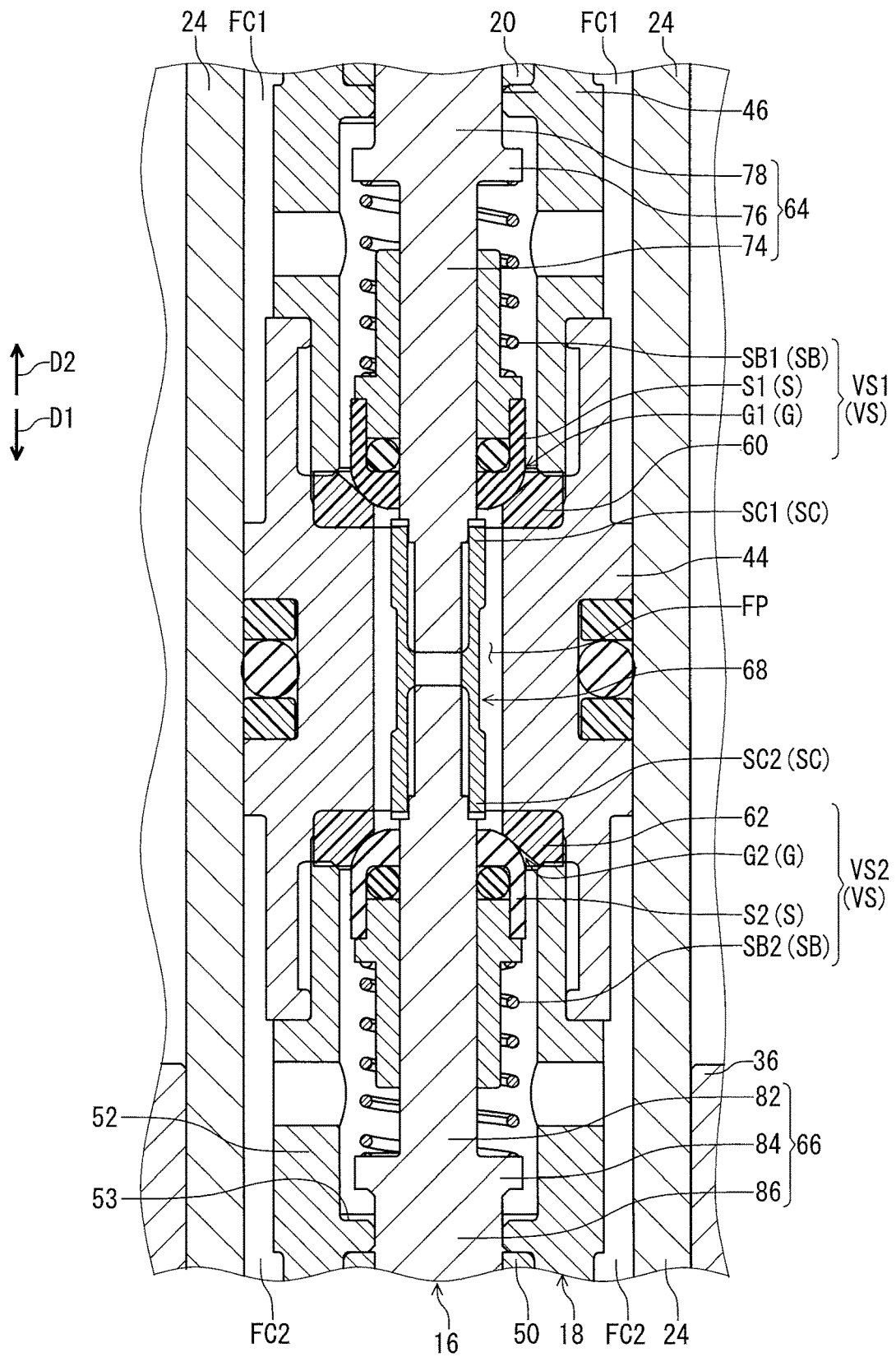
FIG. 7 is an enlarged partial cross-sectional view of the bicycle telescopic apparatus illustrated in FIG. 1 (in a stationary state).

When the user sits on the bicycle seat 6 in the shrinkage stop state, a load related to the user's weight is applied to the hydraulic positioning structure 18 via the inner rod 20. In this situation, the hydraulic positioning structure 18 is moved in the first direction D1 from a shrinkage stop position where the hydraulic positioning structure 18 stays in the shrinkage stop state to a stationary position where the first gate G1 and the second gate G2 are closed. While the hydraulic positioning structure 18 is moved from the shrinkage stop position to the stationary position, the fluid pressure in the second fluid chamber FC2 is increased while the first gate G1 is closed because of the load related to the user's weight applied to the hydraulic positioning structure 18 such that the hydraulic fluid in the second fluid chamber FC2 presses the second seal S2 to close the second gate G2. That is, the hydraulic positioning structure 18 is configured to close the valve structure VS after the actuating member 16 stops moving the second tube 14 in the first direction D1. To the contrary, the actuating member 16 is stationary relative to the first tube 12, because the actuating member biasing member 54 biases the actuating member 16 in the second direction D2, thereby the seal contacting member 68 is separated from the second seal S2. FIG. 7 illustrates a state in which both the first gate G1 and the second gate G2 are closed and the seal contacting member 68 is separated from the second seal S2 due to the above reasons. In the present application, this state is referred to as the stationary state. When the bicycle telescopic apparatus 10 is in the stationary state, the overall length of the bicycle telescopic apparatus 10 is not changed until a next operation of the operating device 2, because the hydraulic fluid does not flow to make the hydraulic positioning structure 18 rigid.

Figure 8:
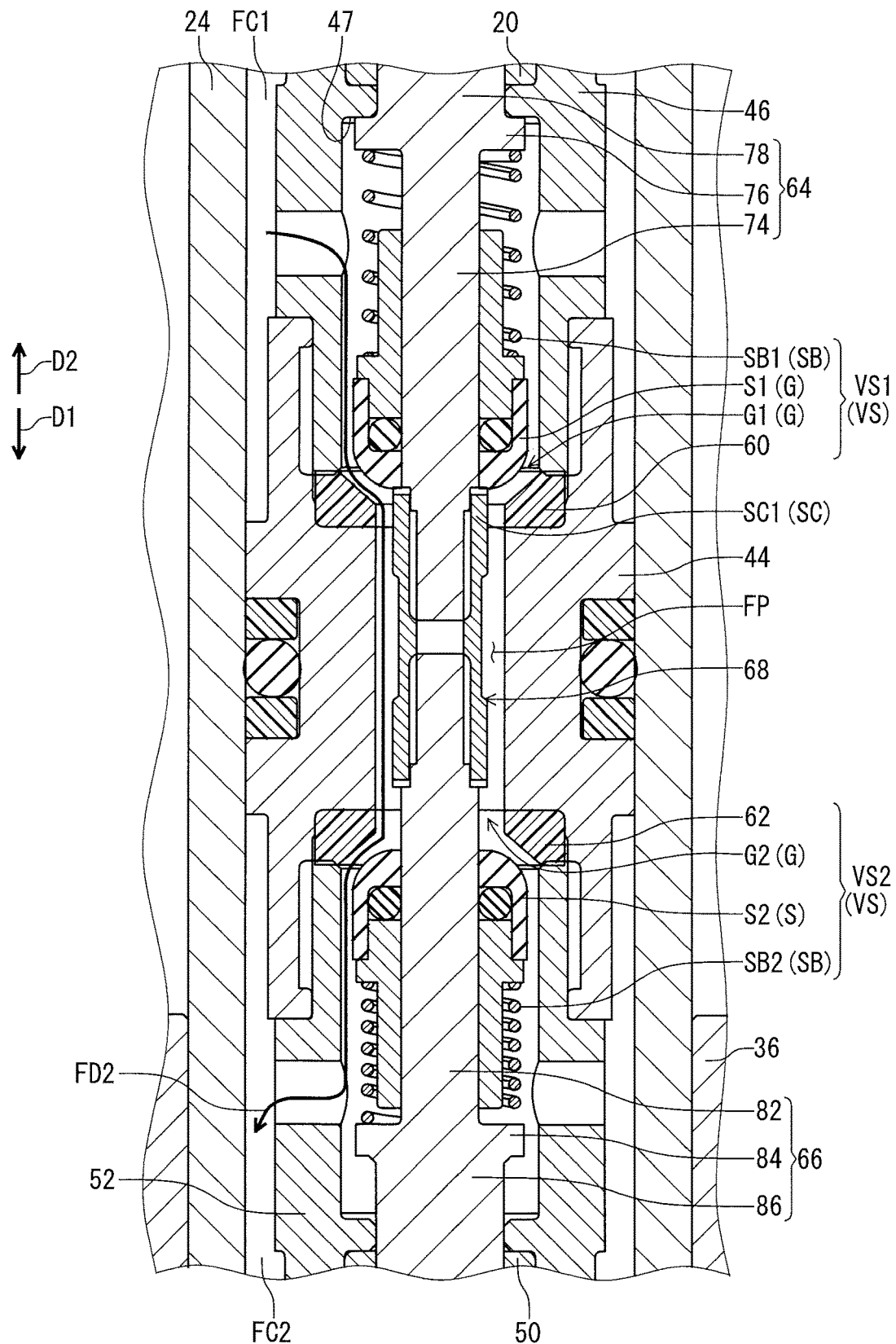
FIG. 8 is an enlarged partial cross-sectional view of the bicycle telescopic apparatus illustrated in FIG. 1 (in an extending state).

When the extension operation Oe is inputted to the operating device 2, the operation cable 3 is released (extended), thereby the actuating member biasing member 54 pushes the actuating member 16 in the second direction D2. Accordingly, the first seal contacting portion SC1 of the seal contacting member 68 slides in the second direction D2 to contact the first seal S1 to open the first gate G1 (See FIG. 8). In the extending state shown in FIG. 8, the actuating member 16 as well as the hydraulic positioning structure 18 is moved in the second direction D2 due to the air pressure in the air chamber AC to press the inner tube 24 in the second direction D2. That is, the actuating member 16 is configured to be moved in the second direction D2 opposite to the first direction D1 along the axial direction Da to open the valve structure VS to move the second tube 14 in the second direction D2. The hydraulic fluid in the first fluid chamber FC1 flows into the second fluid chamber FC2 in a second flow direction FD2 as illustrated in FIG. 8.

Once the first gate G1 is opened, the hydraulic fluid in the first fluid chamber FC1 continues to flow into the second fluid chamber FC2 until the second tube linking portion 84 of the actuating member 16 contacts the second actuating member receiving portion 53 of the tube connecting member 52 to link with the second tube 14 and the piston 44. After the second tube linking portion 84 of the actuating member 16 links with the piston 44, the piston 44 doesn't move any more in the second direction D2, thereby the hydraulic fluid in the first fluid chamber FC1 does not flow. Then, the expansion force of the air in the air chamber AC applies to the fluid in the first fluid chamber FC1, thereby the fluid pressure in the first fluid chamber FC1 becomes greater than that of the second fluid chamber FC2. Accordingly, as seen in FIG. 6, the hydraulic fluid in the first fluid chamber FC1 presses the first seal S1 and the first seal biasing member SB1 presses the first seal S1 against the first seal contact member 60 to close the first gate G1. In the present application, a state of the bicycle telescopic apparatus 10 when the hydraulic fluid in the first fluid chamber FC1 stops flowing into the second fluid chamber FC2 is referred to as the extension stop state.

As described above, the extension stop state is similar to the shrinkage stop state. Accordingly, when the user sits on the bicycle seat 6 in the extension stop state, the hydraulic positioning structure 18 is moved in the first direction D1 to the stationary position as shown in FIG. 7, and the bicycle telescopic apparatus 10 becomes in the stationary state via the above mechanism.

Further, the extension stop state and the shrinkage stop state occur after the actuating member 16 becomes stationary relative to the first tube 12. In addition, the hydraulic positioning structure 18 is configured to position the first tube 12 and the second tube 14 relative to each other in each of the extension stop state and the shrinkage stop state. Accordingly, the hydraulic positioning structure 18 is configured to position the first tube 12 and the second tube 14 relative to each other in a state where the actuating member 16 is stationary relative to the first tube 12.

With the bicycle telescopic apparatus 10, it is possible to shrink the bicycle telescopic apparatus 10 without applying a load to the bicycle telescopic apparatus 10, because the second tube 14 is moved directly by the operation cable 3. For example, in a case where the bicycle telescopic apparatus 10 is a seatpost, it is possible for the user to lower a seat attached to the bicycle telescopic apparatus without sitting on the seat (with standing up on pedals of a bicycle). Accordingly, it is possible to adjust a height of the seat in accordance with traveling condition.

Modification of the First Embodiment

In the first embodiment, the inner rod 20 is connected to the second tube 14 and movable together with the second tube 14 with respect to the first tube 12, and the inner tube 24 is connected to the first tube 12 and movable together with the first tube 12 with respect to the second tube 14. However, the inner rod 20 can be connected to the first tube 12 and movable together with the first tube 12 with respect to the second tube 14, and the inner tube 24 can be connected to the second tube 14 and movable together with the second tube 14 with respect to the first tube 12. Accordingly, it can be described that one of the first tube 12 and the second tube 14 includes the inner rod 20 movable together with the one of the first tube and the second tube with respect to the other of the first tube 12 and the second tube 14. The other of the first tube and the second tube includes the inner tube 24. The inner tube 24 is movable together with the other of the first tube 12 and the second tube 14 with respect to the one of the first tube 12 and the second tube 14.

Second Embodiment

Figure 9:
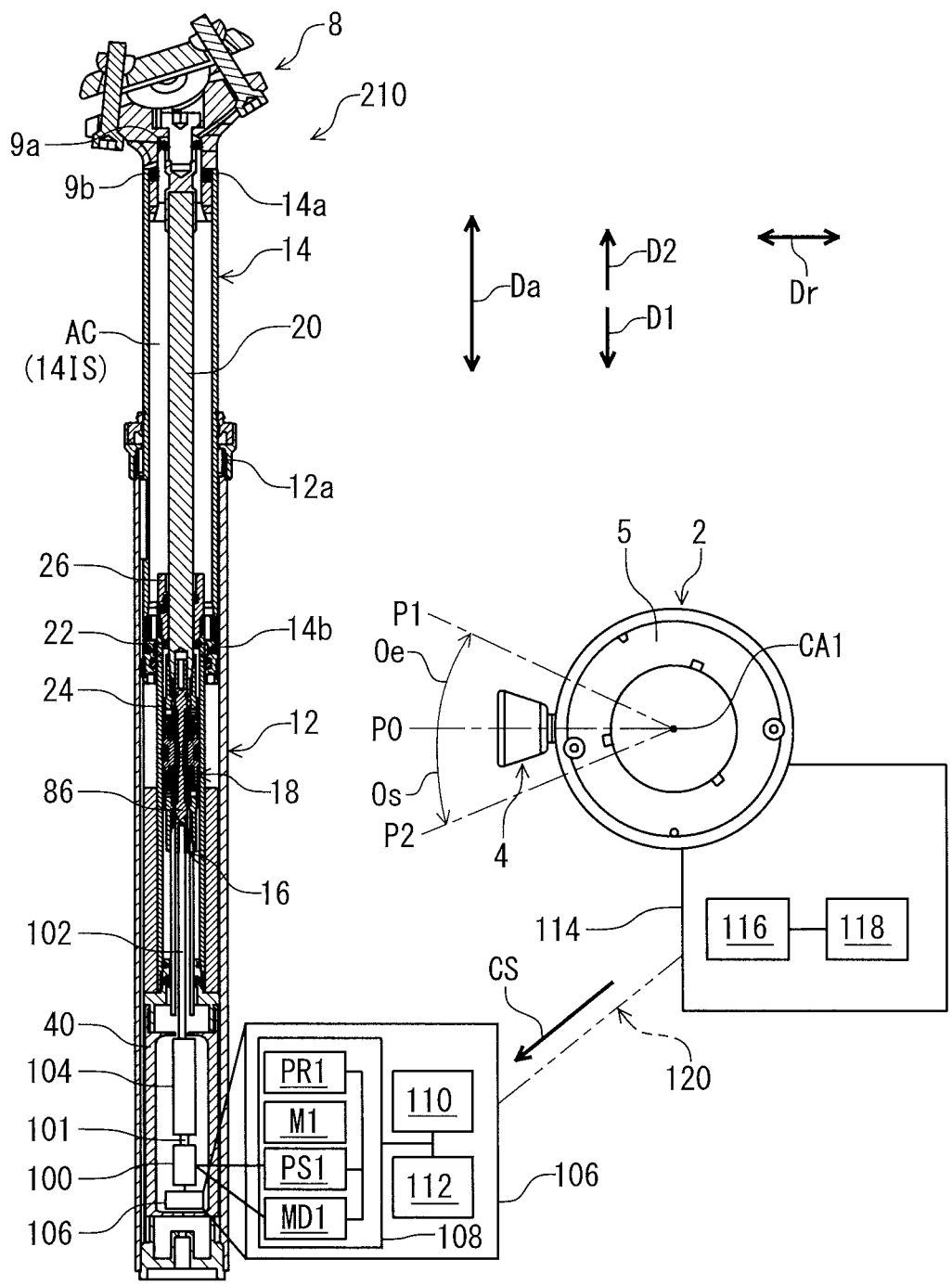
FIG. 9 is a cross-sectional view of the bicycle telescopic apparatus in accordance with a second embodiment.

A bicycle telescopic apparatus 210 in accordance with a second embodiment will be described below referring to FIG. 9. In FIG. 9, the bicycle telescopic apparatus 210 is also illustrated as a seat post. The bicycle telescopic apparatus 210 has substantially the same structures as those of the bicycle telescopic apparatus 10 except for the operation cable 3, the cable length adjusting mechanism 7, the actuating member biasing member 54, the operation cable connector attachment member 70, the operation cable connector 72, the biasing member supporting member 96, and the tube end cap 98. Thus, elements having substantially the same function as those in the first embodiment will be numbered the same here, and will not be described and/or illustrated again in detail here for the sake of brevity.

As seen in FIG. 9, the bicycle telescopic apparatus 210 further comprises a motor 100 to move the actuating member 16 in the axial direction Da in place of the actuating member biasing member 54. The bicycle telescopic apparatus 210 comprises a movable rod 102 operatively coupled to the motor 100 in place of the operation cable connector attachment member 70 and the operation cable connector 72. For example, the movable rod 102 can be connected to the connector attachment member attachment portion 86 of the actuating member 16. The biasing member supporting member 96 and the tube end cap 98 are omitted from the bicycle telescopic apparatus 210. The bicycle telescopic apparatus 210 can comprise a motion converter 104 to convert rotation of a rotor 101 of the motor 100 into linear motion of the movable rod 102. The rotor 101 of the motor 100 is coupled to the movable rod 102 via the motion converter 104. For example, the movable rod 102 can be a rack, and the motion converter 104 can include a pinion engaging with the rack, which is attached to the rotor 101. Alternatively, the motion converter 104 can include a ball screw attached to the rotor 101, and the movable rod 102 can be a nut engaging with the ball screw.

The bicycle telescopic apparatus 210 further include a circuit board 106 including a motor controller 108 which is electrically connected to the motor 100. The motor controller 108 is configured to control the motor 100 to move the actuating member 16 in the axial direction Da. The circuit board 106 can further include a signal receiver 110 to receive a control signal CS from a telescopic apparatus controller 114 which is described hereinafter and a battery 112 supplying electric power to the motor 100 and the signal receiver 110. The motor controller 108 controls the motor 100 in response to the control signal CS.

In this embodiment, the bicycle telescopic apparatus 210 is electrically connected to the telescopic apparatus controller 114 in place of the cable length adjusting mechanism 7. The operating device 2 can include the telescopic apparatus controller 114 and the operating device 2 can include a different operated member from the operated member 4 in the first embodiment. The telescopic apparatus controller 114 is configured to control the bicycle telescopic apparatus 10. The telescopic apparatus controller 114 includes a signal transmitter 116 to transmit a control signal to the signal receiver 110 and a battery 118 supplying electric power to at least the signal transmitter 116. In the illustrated embodiment, the battery 112 is included in the circuit board 106 and the battery 118 is included in the telescopic apparatus controller 114. However, the battery 112 and the battery 118 can be separated from the circuit board 106 and the telescopic apparatus controller 114, respectively. In this case, at least one of the battery 112 and the battery 118 can be used for a bicycle component different from the bicycle telescopic apparatus 210 in addition to the bicycle telescopic apparatus 210.

In this embodiment, the communication between the signal transmitter 116 and the signal receiver 110 can be wired communication or wireless communication. If the communication is wired communication, the signal receiver 110 is connected to the signal transmitter 116 via a communication cable 120. If the communication is wireless communication, the communication cable 120 can be omitted. In this case, the control signal CS is a wireless signal, and the signal transmitter 116 is a wireless transmitter, and the signal receiver 110 is a wireless receiver.

In this embodiment, the motor 100 moves the actuating member 16 via the movable rod 102 in the first direction D1 to make the second tube linking portion 84 of the actuating member 16 in contact with the second actuating member receiving portion 53 of the hydraulic positioning structure 18 to pull the second tube 14 in the first direction D1 (See FIG. 4). Further, the motor 100 moves the actuating member 16 via the movable rod 102 in the second direction D2 to slide the seal contacting portion SC (specifically, the first seal contacting portion SC1) of the actuating member 16 to contact the seal S (specifically, the first seal S1) to open the first gate G1. In addition, especially in this embodiment, the motor 100 can move the actuating member 16 in the second direction D2 to make the first seal biasing member attachment portion 76 of the actuating member 16 in contact with the first actuating member receiving portion 47 of the hydraulic positioning structure 18 to push the second tube 14 in the second direction D2 via the inner rod 20. Accordingly, in this embodiment, the first seal biasing member attachment portion 76 can be also referred to as another second tube linking portion 76. In other words, the actuating member 16 includes another second tube linking portion 76 to link with the second tube 14 to move the second tube 14 in the axial direction Da.

The motor controller 108 includes a processor PR1, a memory M1, a position sensor PS1, and a motor driver MD1. The processor PR1 is electrically connected to the memory M1. The processor PR1 includes a central processing unit (CPU). The memory M1 stores programs and other information. The memory M1 includes a read only memory (ROM), a random access memory (RAM), and a memory controller. For example, a program stored in the memory M1 is read into the processor PR1, and thereby several functions of the motor controller 108 are performed.

To determine a position of the actuating member 16, the position sensor PS1 senses a current position of the movable rod 102 relative to the first tube 12 via the motor 100. Examples of the position sensor PS1 include a contact rotational position sensor such as a potentiometer, and a non-contact rotational position sensor such as an optical sensor (e.g., a rotary encoder) and a magnetic sensor (e.g., a hall sensor). The current position of the motor 100 is stored in the memory M1. The processor PR1 generates a driver control signal to drive the motor driver MD1 based on the control signal of the telescopic apparatus controller 114 and the current position of the motor 100 to move the actuating member 16 toward a new position based on the control signal of the telescopic apparatus controller 114 and the current position of the motor 100.

The motor driver MD1 controls the motor 100 based on the driver control signal generated by the processor PR1. In this embodiment, the motor driver MD1 controls a rotational direction and/or a rotational speed of an output shaft of the motor 100 based on the driver control signal generated by the processor PR1.

The signal transmitter 116 generates the control signal CS based on operation of the operating device 2. Specifically, the signal transmitter 116 generates an extension control signal CS1 and a shrinkage control signal CS2 based on the operation of the operating device 2. The extension control signal CS1 corresponds to the operation of moving the operated member 4 from the rest position P0 to the extension control position P1. The shrinkage control signal CS2 corresponds to the operation of moving the operated member 4 from the rest position P0 to the shrinkage control position P2. The signal transmitter 116 transmits the extension control signal CS1 and the shrinkage control signal CS2 as the control signal CS.

With the bicycle telescopic apparatus 210, it is possible to obtain substantially the same effects as those of the bicycle telescopic apparatus 10 in accordance with the first embodiment. Further, with the bicycle telescopic apparatus 210, it is possible for the motor 100 to make the first seal biasing member attachment portion 76 of the actuating member 16 in contact with the first actuating member receiving portion 47 of the hydraulic positioning structure 18 to push the second tube 14 in the second direction D2 to move the second tube 14 in the second direction D2.

In the above embodiments, the bicycle telescopic apparatuses 10, 210 are illustrated as bicycle seatposts. However, the bicycle telescopic apparatuses 10, 210 can be applied to other bicycle components such as a suspension.

It will be apparent to those skilled in the bicycle field from the present disclosure that the above embodiments can be at least partially combined with each other.

In the present application, the term "comprising" and its derivatives, as used herein, are intended to be open ended terms that specify the presence of the stated features, elements, components, groups, integers, and/or step, but do not exclude the presence of other unstated features, elements, components, groups, integers and/or step. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The term "configured" as used herein to describe a component, section or part of a device includes hardware and/or software that is constructed and/or programmed to carry out the desired function. The desired function can be carried out by hardware, software, or a combination of hardware and software.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle telescopic apparatus comprising:
   a first tube defining an axial direction and including an inner tube and a first inner tube end portion provided in an axial end of the inner tube;
   a second tube telescopically received in the first tube in the axial direction such that the second tube is configured to be inserted into the first tube, the second tube including an inner rod to be movable together with the second tube with respect to the first tube, the first inner tube end portion having a through hole through which the inner rod is inserted into the inner tube, an entire gap in the through hole between the inner rod and the first inner tube end portion being sealed by an end portion seal that is stationary with respect to the first inner tube end portion;
   an actuating member movable relative to the first tube in the axial direction of the first tube via the inner rod, the actuating member being configured to move the second tube relative to the first tube in the axial direction; and
   a hydraulic positioning structure configured to position the first tube and the second tube relative to each other in the axial direction and including:
      a first fluid chamber and a second fluid chamber which are provided in the inner tube; and
      a piston attached to the inner rod to sealingly divide a space in the inner tube into the first fluid chamber and the second fluid chamber in the axial direction.

2. The bicycle telescopic apparatus according to claim 1, wherein the hydraulic positioning structure is configured to position the first tube and the second tube relative to each other in a state where the actuating member is stationary relative to the first tube.

3. The bicycle telescopic apparatus according to claim 1, wherein the hydraulic positioning structure includes a valve structure to open or close a fluid flow path in the bicycle telescopic apparatus.

4. The bicycle telescopic apparatus according to claim 3, wherein the actuating member is configured to be moved in a first direction along the axial direction to open the valve structure to move the second tube in the first direction.

5. The bicycle telescopic apparatus according to claim 4, wherein the actuating member is configured to be moved in a second direction opposite to the first direction along the axial direction to open the valve structure to move the second tube in the second direction.

6. The bicycle telescopic apparatus according to claim 4, further comprising:
   an actuating member biasing member to bias the actuating member in a second direction opposite to the first direction along the axial direction.

7. The bicycle telescopic apparatus according to claim 3, wherein the hydraulic positioning structure is configured to close the valve structure after the actuating member stops moving the second tube in the first direction.

8. The bicycle telescopic apparatus according to claim 1, further comprising:
   a motor to move the actuating member in the axial direction.

9. The bicycle telescopic apparatus according to claim 1, the hydraulic positioning structure further including:
   a valve structure.

10. The bicycle telescopic apparatus according to claim 9, wherein the valve structure is provided between the first fluid chamber and the second fluid chamber in the axial direction.

11. The bicycle telescopic apparatus according to claim 10, the hydraulic positioning structure further including an additional valve structure closer to the second fluid chamber than to the valve structure in the axial direction.

12. The bicycle telescopic apparatus according to claim 9, the valve structure including:
a gate through which hydraulic fluid is to flow;
a seal to seal the gate; and
a seal biasing member to bias the seal toward the gate.

13. The bicycle telescopic apparatus according to claim 12, wherein the actuating member includes a seal contacting portion to contact the seal to open the valve structure when the actuating member moves in the axial direction.

14. The bicycle telescopic apparatus according to claim 1, further comprising an air chamber to bias the second tube to lengthen the second tube out of the first tube.

15. The bicycle telescopic apparatus according to claim 1, wherein the actuating member is connected to an operation cable to move the actuating member in a first direction along the axial direction.

16. The bicycle telescopic apparatus according to claim 1, wherein the actuating member includes a second tube linking portion to link with the second tube to move the second tube in the axial direction.

17. A bicycle telescopic apparatus comprising:
a first tube defining an axial direction;
a second tube telescopically received in the first tube in the axial direction;
an actuating member movable relative to the first tube in the axial direction of the first tube, the actuating member being configured to move the second tube relative to the first tube in the axial direction; and
a hydraulic positioning structure configured to position the first tube and the second tube relative to each other in the axial direction,
wherein the second tube includes an inner rod movable together with the second tube with respect to the first tube,
wherein the actuating member is configured to move the second tube via the inner rod,
wherein the first tube includes an inner tube to accommodate the inner rod,
wherein the hydraulic positioning structure includes:
a valve structure;
a first fluid chamber and a second fluid chamber which are provided in the inner tube;
a piston attached to the inner rod to divide a space in the inner tube into the first fluid chamber and the second fluid chamber in the axial direction;
a gate through which hydraulic fluid is to flow;
a seal to seal the gate; and
a seal biasing member to bias the seal toward the gate, and
wherein the seal biasing member is provided between the actuating member and the seal in the axial direction.

18. A bicycle telescopic apparatus comprising:
a first tube defining an axial direction and including an inner tube and a first inner tube end portion provided in an axial end of the inner tube;
a second tube telescopically received in the first tube in the axial direction such that the second tube is configured to be inserted into the first tube, the second tube including an inner rod to be movable together with the second tube with respect to the first tube, the first inner tube end portion having a through hole through which the inner rod is inserted into the inner tube;
an actuating member movable relative to the first tube in the axial direction of the first tube via the inner rod, the actuating member being configured to move the second tube relative to the first tube in the axial direction; and
a hydraulic positioning structure configured to position the first tube and the second tube relative to each other in the axial direction and including:
a first fluid chamber and a second fluid chamber which are provided in the inner tube, a gap in the through hole between the inner rod and the first inner tube end portion being sealed such that hydraulic fluid in the first fluid chamber and the second fluid chamber does not pass through the gap between the inner rod and the first inner tube end portion; and
a piston attached to the inner rod to sealingly divide a space in the inner tube into the first fluid chamber and the second fluid chamber in the axial direction.

* * * * *